(No Model.)
G. J. OVERSHINER.
ROAD CART.
No. 498,687. Patented May 30, 1893.
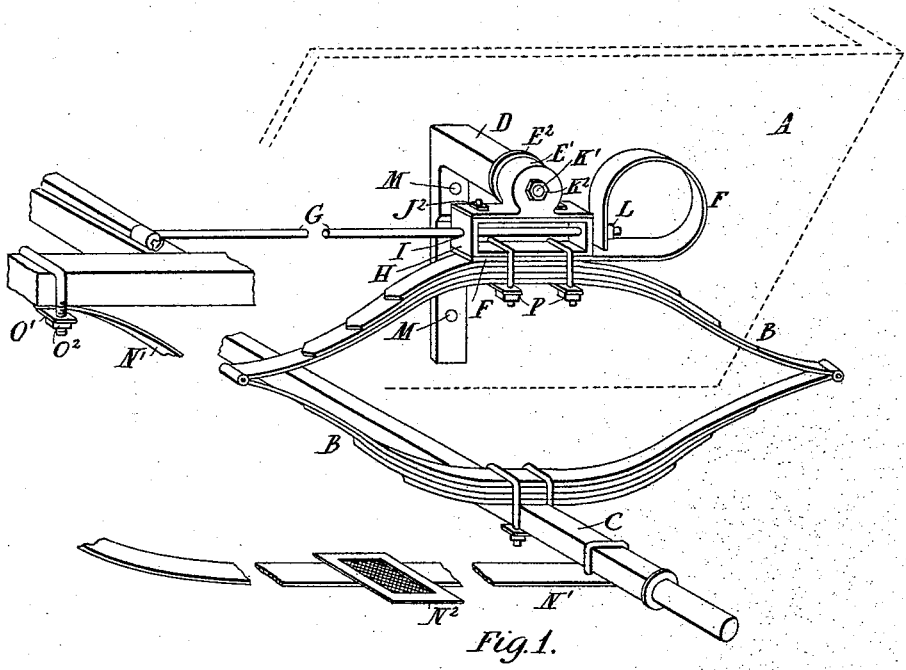
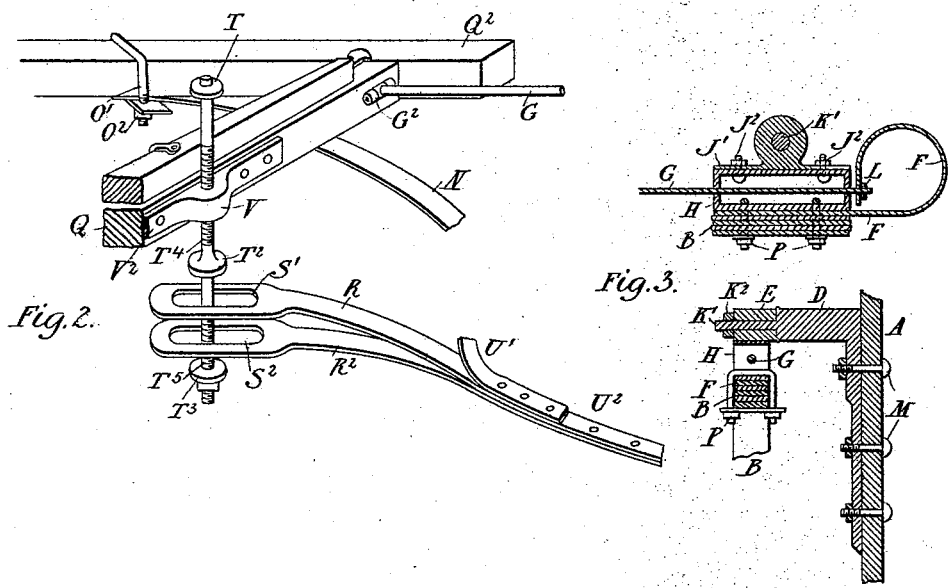
Witnesses
Will S. Norton
Edw. F. Clarke
Inventor
Gideon J. Overshiner
By M. W. Sudley Attorney

UNITED STATES PATENT OFFICE.

GIDEON J. OVERSHINER, OF SAN DIEGO, CALIFORNIA.

ROAD-CART.

SPECIFICATION forming part of Letters Patent No. 498,687, dated May 30, 1893.

Application filed June 23, 1892. Serial No. 437,797. (No model.)

*To all whom it may concern:*

Be it known that I, GIDEON J. OVERSHINER, a citizen of the United States, and a resident of the city and county of San Diego, State of California, have invented a new and useful Road-Cart; and I hereby declare that the following is a full, clear, and exact description of my invention, such as will enable others skilled in the art to which it appertains to make and use the same.

My invention relates to a new and novel "road cart" whereby the movement of the horse is not in any manner transmitted to the rider seated in the vehicle, the construction of which will be hereinafter more fully described.

In the accompanying drawings, which illustrate my invention and form a part of this specification—

Figure 1 is a perspective view of one side of the cart, showing the manner of mounting the body upon the springs and the other mechanism connected therewith as constructed for use. Fig. 2 is a detail view of a portion of the shafts, a bar showing the forward connection of the vehicle as attached to same. Fig. 3 represents the journal box and seats mounted and secured on top of springs showing the bent axle secured in same, to which is secured the body of the vehicle, and between the journal box seats and the vehicle springs are also secured and shown curved band springs, and passing through the curved end of the springs and journal box seats are reaches or rods pivotally secured at the forward end to the cross bar of the shafts.

Referring to the drawings, A is the body of the road cart; B, an ordinary elliptic spring; C, an ordinary steel axle; D, the bent axle made fast to body of vehicle; E', the bent axle journal box; E², shoulder of spindle; F, curved spring; G, pivotal reaches securing upper parts of the vehicle to the shafts; H, seat for journal box in which rests the spindle of the bent axle; I, openings in both ends of the seat through which the rod G passes; J', bottom plate of the journal box; J², the bolts which secure the same to seat H; K', front end or hub of journal box; K², the nut securing the spindle in box E; L, nut secured on rear end of pivotal reaches to hold it in position the spring when in operating the same; M, bolts securing bent axle to body A; N', lower brace bar connecting the axle to shafts Q²; N², step secured on brace bar; O', cleats; O², plate and nuts securing the upper end of braces to shafts; P. P., cleats and bolts securing journal seats to springs; Q', cross bar connecting shaft arms Q²; Q²., shaft arms; R', upper spring prong of spring U²; R²., lower spring prong of spring U'; S', oblong slot; S²., oblong slot; T', vertical screw bolt; T²., stop shoulder on bolt; T³., the lower regulating bolt; T⁴., screw thread on upper half of bolt; T⁵, screw thread on lower end of bolt; U', brace to the body U² rear end of spring; V., screw bracket; V²., the bolts securing same to the center of rear side of cross-bar.

The letters of reference indicate corresponding parts in all the figures.

Referring to the several parts by letter: A. indicates the body of the vehicle and may be constructed of any suitable material; B ordinary spring generally used on all light vehicles; C also an ordinary steel axle, to which the vehicle springs are secured as in the ordinary way; D a bent axle constructed in the form shown and secured to the vehicle sides. The body A is secured by bolts M, on the end of which is formed a spindle K' the same as upon ordinary vehicle axles. The axle D is first secured to the body A and when mounting the same upon the springs B, seats H and curved springs F are first placed between the seats H and springs B, when the same is rigidly secured to vehicle spring B by clips P. P. When thus secured the rods or reaches G are passed through perforations I in seats H, and curved end of spring F when the end of which is secured by nuts L, while the forward end of reach rod G is pivotally secured to the cross-bar Q by a thill coupling G² on both sides of the vehicle near the shaft arms Q². On the top of seats H, I secure plates J' by bolts J², which has arranged and constructed upon it a suitable spindle or journal box E in which is secured in like manner as wheels upon ordinary vehicle axles are secured in the said journal box E, thus forming a perfect rest, and pivotal socket for the axle D to operate and carry the weight in the body A of the vehicle. The construction here shown of the journal box E' and plate J may be constructed separately or in one piece or the seats H together may form one piece of the mechanism for carrying the body A, having axles D as constructed for operating therein as shown. The spring U² is constructed in two parts, and on the top of same is also placed the brace U'. The forward end of the spring U² stands apart when the rear end is made fast. In the ends of the prong R' and R² are made oblong slots S' and S². The prong R² has no spring in it, while prong R' directly above, being very elastic when pressed upon. The rear end of spring U² is bolted on the bottom of the body and in the center of the front part thereof while the other end of said spring is strung on the screw bolt T through oblong slots S' and S², the bottom prong R² resting upon an adjustable screw nut T³ when it is desired to raise the prong R' up, and against the stop shoulder T². The nut T³ is adjusted so as to bring the two prongs R' R² together sufficiently so they will move freely forward and back by the movement of shafts, and at the same time prevent any rattling. The oblong slots S', S² is constructed in the form shown, for the purpose of giving a free forward and back movement as the slots will indicate, while the up and down motion caused by the movements of the animal while traveling, is thus overcome. The screw bolt T is held in the vertical position, by being secured in a perforated screw bracket V, the same being secured in the center on the rear side of cross bar Q. The upper half of bolt T has screw thread T⁴, and the lower half has screw thread T⁵, for the purpose on the upper part for adjusting the front part of body A to the desired position required by the rider, and the lower portion of the said bolt is for the purpose of adjusting the spring prongs R' R², as may be desired.

The object of my improved devices as constructed and attached to road carts in the manner shown, is for producing a much easier riding vehicle, and at the same time relieving the rider as well as the animal from the tiresome, jerking, and see-saw motion generally produced by the movements of the horse in the more commonly constructed road carts now in use.

Having thus fully described my invention, what I claim, and desire to secure by Letters Patent, is—

1. A road cart comprising in combination, the body, the main axle, auxiliary axles connected to said body, the elliptical springs secured to the main axle, and having pivotal connection with the auxiliary axles, the thills and flexible connections between the thills and the main and auxiliary axles substantially as and for the purpose set forth.

2. A road cart comprising in combination the body, the main axle, auxiliary axles connected to said body, the elliptical springs secured to the axle and having pivotal connection with the auxiliary axles, the thills, brace bars connecting the axle and thills, the reach connecting at one end to the thills, and movably connected a its other end to the auxiliary axle mechanism, and springs connected to the elliptical springs and to the reaches, the combination being and operating substantially as set forth.

3. In a road cart having bent axle D, spindle box E' and shoulder E², curved spring F, forward reaches G, rests or seats frame H, perforations I, spindle plate J secured to seats frame by bolts J², end of spindle box K' and spindle of axle D secured to outer end of journal box by nuts K², and the rear end of reach rod G secured through curved spring F by bolt L, axle D secured to body A by bolts M M and N' braces from axles C, to shaft arms Q for securing running gear of vehicle to shafts, N² step, the forward end of braces N' secured by cleats O, having plate O² for holding same in position. P. P. bolt clevises securing seat H to spring B. Q cross bar. Q² shaft arms. R' R² spring arms or prongs. S' S² oblong slots. T vertical screw bolt. T² stop or shoulder, T³ nut, T⁴ upper thread screw, T⁵ lower thread screw. V screw plate or bracket. V² bolt securing same to the cross bar on the rear side, all for the purposes shown and described.

In witness whereof I have hereunto affixed my signature.

GIDEON J. OVERSHINER.

Witnesses:
A. B. SMITH,
C. F. KIRBY.